July 14, 1970 — V. D. POLHEMUS ET AL — 3,520,180
ROAD SIMULATOR FACILITY

Filed Nov. 8, 1967 — 3 Sheets-Sheet 1

INVENTORS.
Von D. Polhemus,
Ming-Chih Yew &
Bernard H. Ris

Thomas N. Young
ATTORNEY

INVENTORS.
Von D. Polhemus,
Ming-Chih Yew &
Bernard H. Ris

Thomas N. Young
ATTORNEY

INVENTORS.
Von D. Polhemus,
Ming-Chih Yew &
Bernard H. Ris

Thomas N. Young
ATTORNEY

United States Patent Office 3,520,180
Patented July 14, 1970

3,520,180
ROAD SIMULATOR FACILITY
Von D. Polhemus, Pontiac, Ming-Chih Yew, Utica, and Bernard H. Ris, Royal Oak, Mich., assignors to General Motors Corporation, a corporation of Delaware
Filed Nov. 8, 1967, Ser. No. 681,475
Int. Cl. G01m 7/00, 17/04
U.S. Cl. 73—71.7
6 Claims

ABSTRACT OF THE DISCLOSURE

A road simulator for vehicle suspension system evaluation including, for each suspended wheel, a simulator unit comprising a pair of drums mounted on a spring-suspended frame and linked by a flat belt. A roller pad defining a flat wheel support surface contacts the belt mediate the drums and is resiliently connected to the frame. An hydraulic actuator is directly connected to the roller pad to permit vertical displacement inputs of varying frequency to be applied to the pad. Individual units may be interconnected to simulate road camber behavior.

SUMMARY OF THE INVENTION

This invention relates to road simulation systems for vehicular component evaluations and more particularly to an improved system which accurately simulates a road surface under rolling contact conditions wherein vertical displacements may be simulated over a broad frequency and amplitude range.

Vehicular components such as suspension systems can be and are evaluated under actual road conditions. However, such evaluation requires the installation of equipment in the vehicle as well as the use of test road facilities. Thus, it often becomes advantageous, especially in the case of early development stage evaluation, to conduct tests in a cell under simulated road conditions.

In accordance with the present invention, vehicle suspension system and associated components such as wheels and tires may be evaluated under conditions which closely and accurately simulate actual road conditions. This is accomplished by providing, for each wheel system to be tested a flat moving wheel support surface, similar to a treadmill. In a preferred embodiment, a flexible belt is engaged by two rotatable drums, at least one of which may connect to an energy source or absorber, and means such as rollers are disposed in contact with the belt mediate the drums to provide a load support surface.

A further advantage of the invention is the system capability to provide vertical displacement inputs to the wheel system via the load support surface and the belt. In accordance with the invention, this may be accomplished by connecting the load support means to a frame member by spring means having a high frequency input signal transfer characteristic and connecting the frame to a reference surface such as a fixed slab by damper means having a low frequency input signal transfer characteristic and a high frequency damping action. An actuator device such as an hydraulic shaker is provided to displace the support surface over a large frequency range without excessive power consumption.

The invention may be best understood by reference to a detailed description of a specific embodiment. This description follows and is to be taken together with the accompanying drawing of which:

Figure 1:
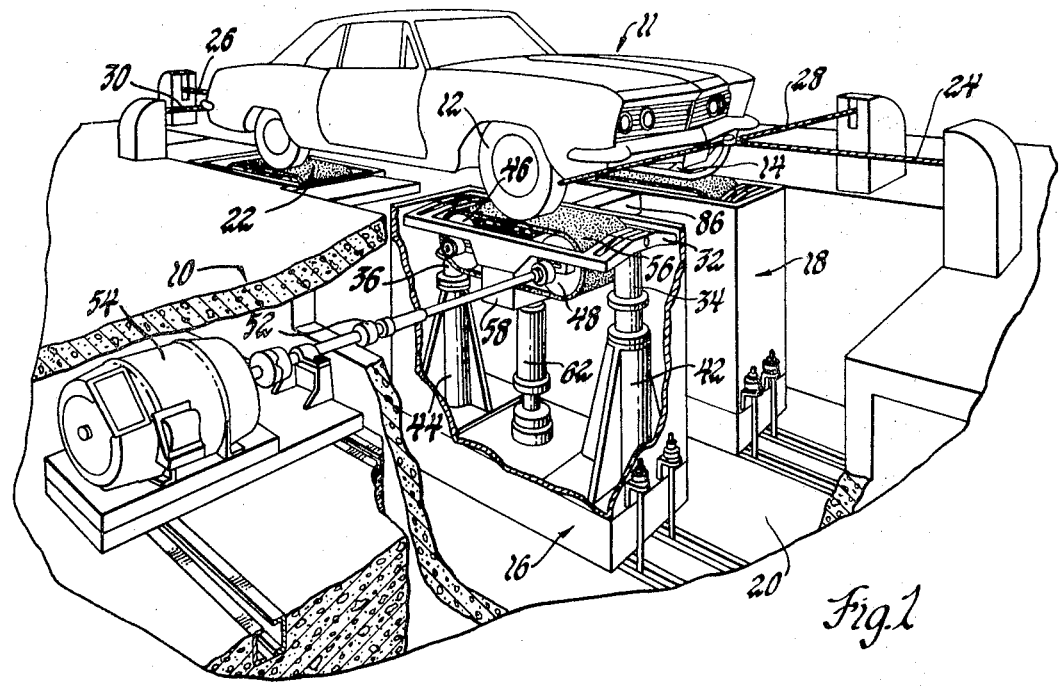
FIG. 1 illustrates a four-wheel automobile test cell which embodies the invention.

FIG. 1 illustrates a laboratory test cell having a first level floor 10 and a sub-level floor 20. The first level floor 10 is designed to accommodate a conventional four-wheel vehicle 11. Each of the four wheels is interconnected with the vehicle body by means of a conventional suspension system. Vehicle 11 is situated in the cell such that front wheels 12 and 14 rest on individual road simulator units 16 and 18, respectively. The rear wheels may be similarly disposed on individual simulator units as indicated at 22. It is to be understood that in this description, "wheel" refers to a complete tire-wheel combination. All simulator units 16, 18, 22 and the fourth unit which is hidden by the vehicle 11 are identical and are anchored to steel rails in the concrete subfloor 20 which defines a reference surface. Units 16 and 18 are spaced apart according to the tread of vehicle 11 and units 16 and 22 are spaced apart according to the wheelbase of the vehicle. Means may be provided to permit adjustment in these spacings to accommodate various vehicles.

When the vehicle 11 is placed in the position shown in FIG. 1, fore and aft guy cables 24 and 26 may be fastened to the vehicle to restrain longitudinal movement and lateral guy cables 28 and 30 may be attached to restrict lateral movement. Each of the cables is connected to a unit which permits a measurement of the tension in the cables.

Figure 2:
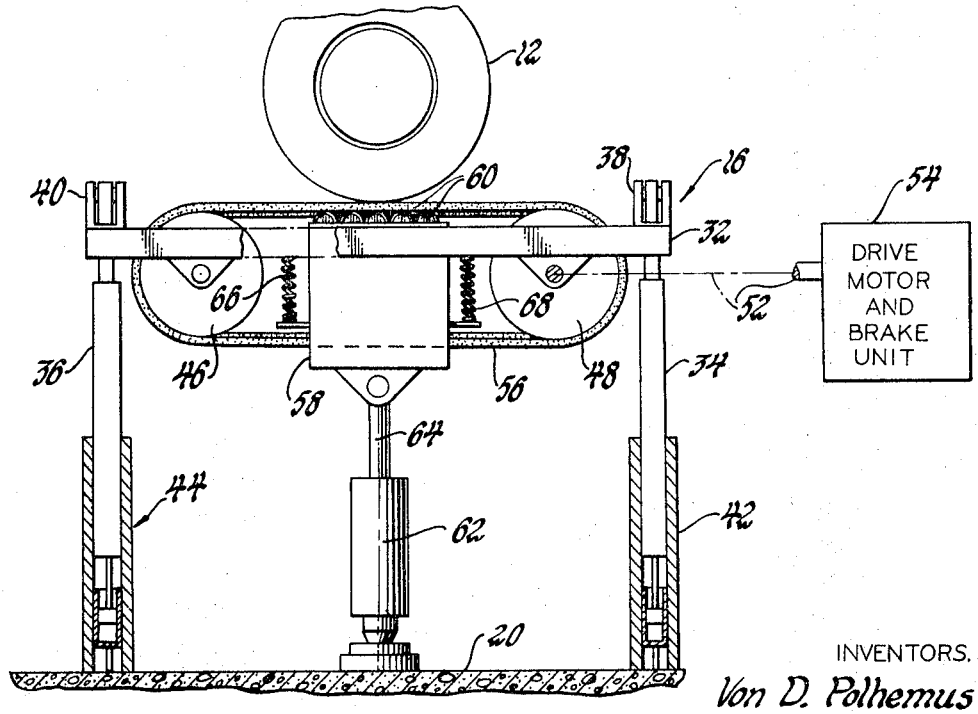
FIG. 2 is a detailed schematic diagram of a typical wheel assembly simulator unit.

FIG. 2 is a side view of simulator unit 16 and will be described in detail with the understanding that this description also applies to the other three simulator units. Unit 16 simulates a flat road surface in direct contact with a rotating wheel 12 to permit a direct input to the tire of a road profile displacement which may be coordinated with vehicle speed. Accordingly, the simulator unit 16 is capable of both linearly moving (rotating) with the wheel 12 and forcing vertical movements thereof.

Simulator 16 comprises a rigid perimeter frame 32 which is pivotally connected to two rigid vertical support posts 34 and 36. Pivots 38 and 40 permit the frame to be angularly displaced about a longitudinal axis to simulate road surface camber or tilt. Support posts 34 and 36 fit into and form an operative part of large damper units 42 and 44, respectively, which are mounted on the concrete subfloor 20. Units 42 and 44 permit low frequency relative displacement between frame 32 and floor 20. Frame 32 supports two large rotatable drums 46 and 48 which are spaced apart longitudinally and are rotatable about parallel axes. Drum 48 is mechanically connected by jointed shaft 52 to a motor-generator unit 54 which can supply driving power to drum 48 or act as a brake in accordance with the particular test being run. A flexible continuous belt 56 is engagingly disposed over the drums 46 and 48 to be rotated thereby in a manner similar to a treadmill. Belt 56, which provides the actual contact surface for wheel-tire combination 12, may be constructed of rubber having layers of longitudinal and lateral steel reinforcing cords.

A load support unit 58 is disposed mediate drums 46 and 48 and is provided with a pad having a plurality of rollers 60 which contact the inner surface of the uppermost portion of belt 56. The roller pad assembly which is better shown in FIG. 5 thus provides in combination with belt 56 a flat load support surface directly beneath vehicle wheel 12 which, though maintained beneath the wheel 12 provides rolling contact conditions.

Load support unit 58 is rigidly connected to a hydraulic actuator unit 62 by means of an output shaft 64. The unit 62 is also mounted on the concrete subfloor 20. A suitable actuator may be purchased from the MTS Company of Minneapolis, Minn. under model number MTS Cylinder Model 204.22(130). Unit 62 applies a vertical displacement force to the load support unit 58 to constitute the road profile displacement input to wheel 12.

Support unit 58 is interconnected with perimeter frame 32 by means of coil springs 66 and 68. These springs permit high frequency relative displacement between load support unit 58 and the perimeter frame 32. An important advantage results from the separate suspension of load support unit 58 relative to frame 32 and the suspension of frame 32 relative to the subfloor 20. For low frequency input signals from actuator 62 the entire assembly 16 comprising perimeter frame 32, belt 56, drums 46 and 48 and the load support unit 58 displace vertically together. However, for higher frequency input signals the frequency selective characteristics of the damper units 42 and 44 and the springs 66 and 68 permit the load support unit 58 to be displaced relative to frame 32, the flexibility of the belt 56 being such to permit such relative displacement. Accordingly, a broad frequency range of displacement inputs is possible without excessive power consumption at high frequency which would result from attempts to displace the entire mass of unit 16. In addition, this broad frequency range permits close correlation of displacement inputs with vehicle speed thus improving the overall fidelity of the simulation process. This correlation may be provided, for example, by a two-track tape recording, one track representing road profile and the other representing test vehicle speed.

Figure 3:
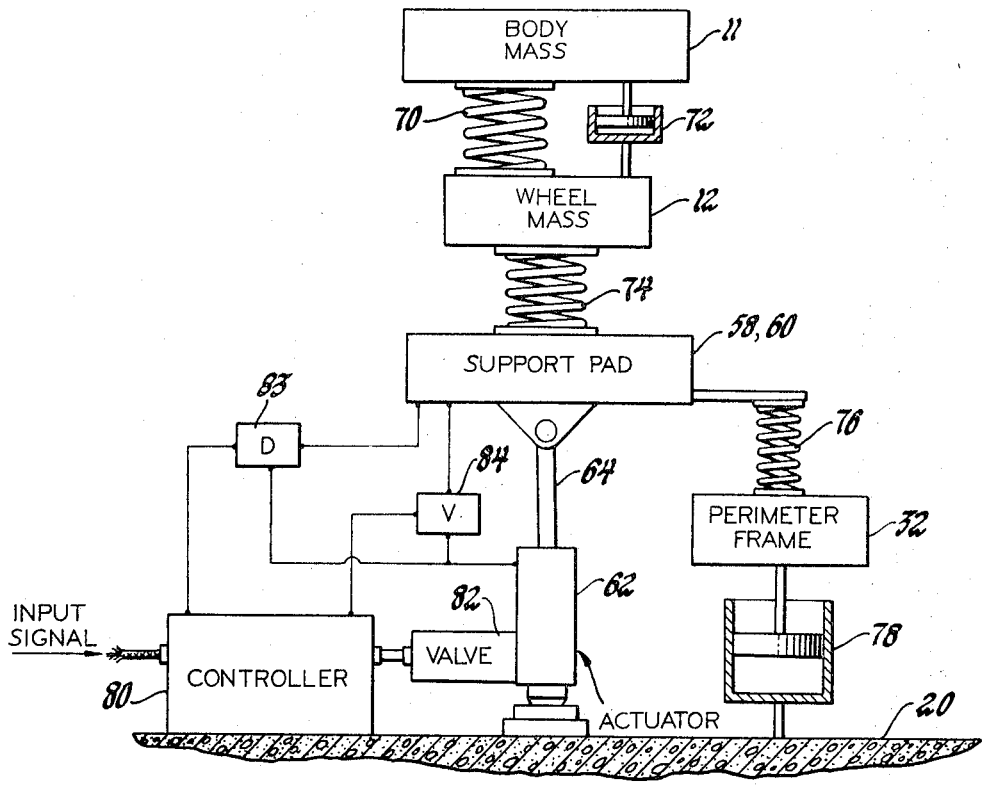
FIG. 3 is a functional diagram of the unit shown in FIG. 2.

FIG. 3 is a functional schematic diagram of the simulator unit 16 which is offered as assistance to a user of the invention. The mass of vehicle body 11 is supported relative to the wheel 12 by means of a suspension system having a spring characteristic represented at 70 and a damping characteristic represented at 72. The wheel 12 rests upon the support unit 58 and roller pad 60 and provides a tire spring characteristic represented by spring 74. The perimeter frame 32 is supported by compression springs 66 and 68, the combined effect of which is indicated at 76. In addition, the damper units 42 and 44, cumulatively indicated at 78 interconnect the frame 32 and the floor 20 for damping action at high operating frequencies. An electrohydraulic controller 80 is connected to the actuator unit 62 by means of a valve 82 to provide a displacement producing force on the connector rod 64 which interconnects support unit 58 and actuator 62. As indicated, controller 80 receives an input signal representing road profile from a suitable device such as a tape recorder. Feedback signals representing amplitude and velocity of displacement of support unit 58 relative to the subfloor 20 may be obtained from transducers 83 and 84, respectively. These feedback signals may be connected into a combining device in the controller 80 to ensure a faithful reproduction of the road profile represented by the input signal.

As suggested in FIG. 1, a complete test cell comprises four simulator units, one for each wheel of the vehicle 11. However, it is to be understood that valuable and accurate information may be obtained from the use of only one simulator unit. For example, a single wheel suspension unit comprising a wheel, tire, suspension and a mass representing a portion of the vehicle 11 may be properly disposed on a single simulator unit to yield information pertaining exclusively to the wheel assembly under test. This information may relate to tire characteristics as well as suspension performance.

Figure 4:
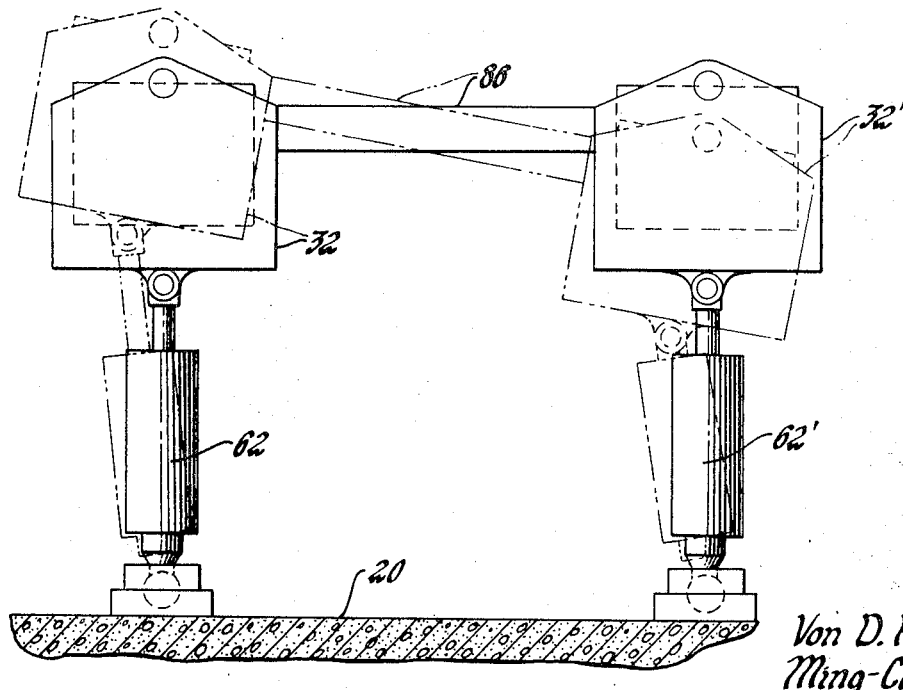
FIG. 4 illustrates a manner in which two separate wheel units may be connected to simulate road camber.

FIG. 4 illustrates how two laterally adjacent simulator units may be interconnected by means of a beam 86 to simulate road camber and tilt conditions. In the figure, two simulator unit perimeter frames 32 and 32' having independent actuators 62 and 62' mounted on subfloor 20 are interconnected by means of a rigid beam 86 to have coordinated movement. A sliding beam is used which will maintain a road camber according to the difference in the vertical movements of the two perimeter frames 32 and 32'. As indicated, the frame-support post connections and the actuator-pad connections are all pivotal to permit the camber simulation.

Figure 5:
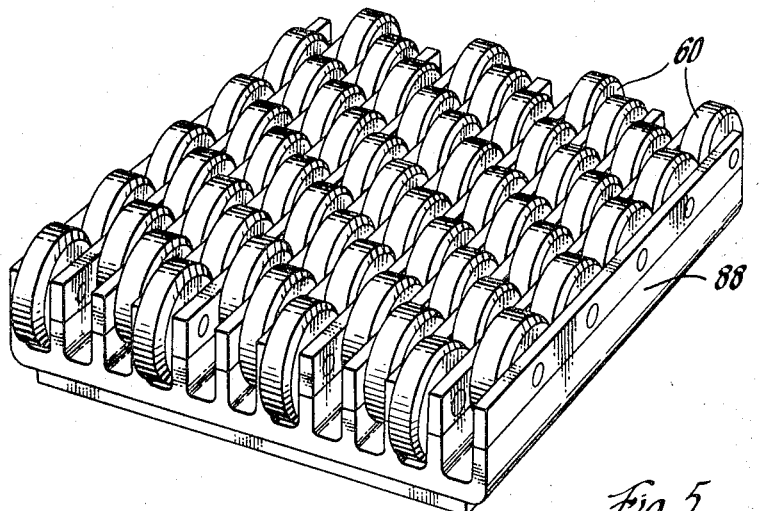
FIG. 5 illustrates a roller pad which may be used to establish a load support surface.
Figure 6:
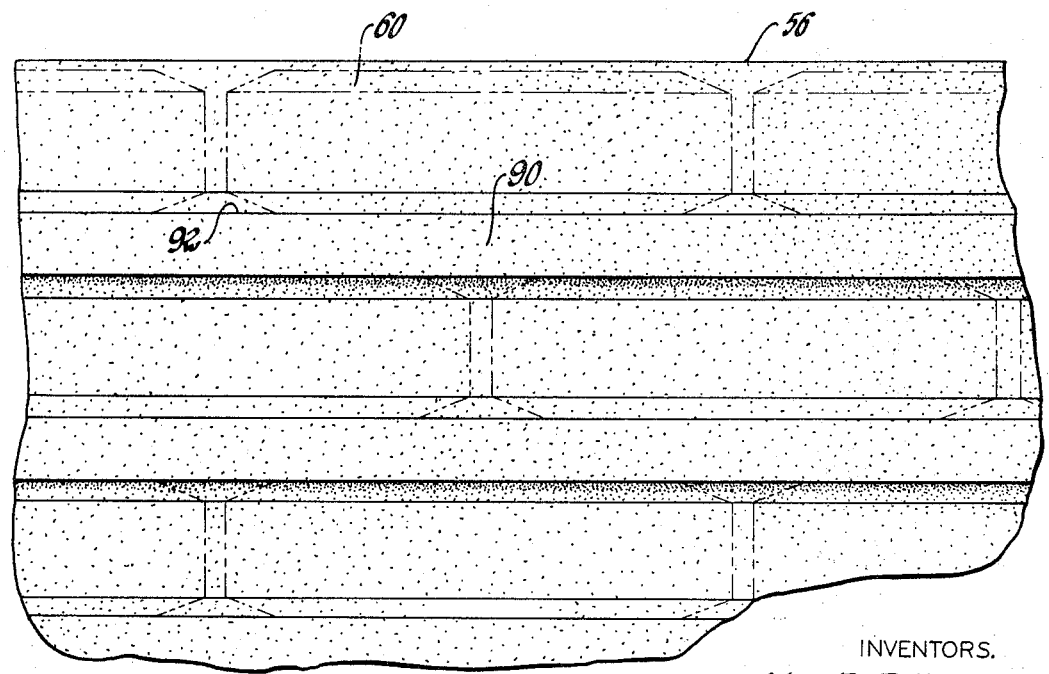
FIG. 6 shows how the roller pad acts together with a flexible belt of preferred design.

FIG. 5 illustrates a roller pad which is associated with load support unit 58 to provide a relatively uniform load support surface beneath the moving belt 56. A channeled frame member 88 holds a plurality of rotatably mounted rollers 60 arranged in staggered rows to minimize any surface discontinuities. As shown in FIG. 6, the flexible belt 56 has a plurality of ribs 90 formed on the inner surface thereof. These ribs define a plurality of parallel longitudinal grooves 92 which accommodate the rollers 60 therein. As an alternative to the mechanical roller support pad, a hydrostatic air pad may be disposed between the load support unit 58 and the inner surface of belt 56. Under these conditions the inner surface of belt 56 is relatively flat. This alternative provides a film of low pressure air to support the belt 56 free from physical contact with the load support unit 58.

The following specifications are offered by way of example and by no means are intended to limit the scope of the invention. The belt 56 may be approximately 20 inches in width and capable of withstanding a load of 1,500 pounds. A 50 horsepower drive source for the front wheels and a 100 horsepower source for the rear wheels may be used to provide loaded-condition speeds of up to 100 m.p.h. In a multiwheel system the drive motors may be linked electrically to a speed reference source to provide accurate speed correspondence between wheels. A suitable actuator unit has a capacity of 7000 pounds of thrust and a maximum travel of 10 inches. A frequency range of 0 to 25 c.p.s. is suitable.

The foregoing description of a specific embodiment of the invention shall not be construed as limiting the invention to the specific apparatus shown. For a definition of the invention, reference should be taken to the appended claims.

We claim:

1. Apparatus for simulating the effects of a load bearing surface on a rolling vehicle wheel comprising:
    a support frame, damping means connecting the frame to a reference surface to permit relative displacement therebetween, a pair of drums mounted on the frame in spaced relation for rotation about parallel axes, a flexible belt having an inner surface engaging the drums to be rotatable therewith,
    load support means for providing a load support area of the belt mediate the drums,
    actuator means connected to the load support means for imparting reciprocating displacement inputs thereto over a range of selectable frequencies,
    and spring means supporting the frame relative to the load support means and having a frequency selective transfer characteristic whereby relatively low frequency inputs cause the load support means and the frame to be displaced substantially together and inputs of a relatively high frequency cause the load support means to be displaced relative to the frame.

2. The apparatus defined in claim 1 wherein the load support means comprises an array of rotatably supported rigid rollers arranged in staggered rows to provide a substantially uniform load support surface, said rollers contacting the inner surface of the belt mediate the drums, and ribs formed in said inner surface to prevent lateral displacement of the belt.

3. The apparatus defined in claim 1 including a power source and means connecting the source to at least one of the drums.

4. The apparatus defined in claim 1 including braking means connected to at least one of the drums.

5. Road simulator apparatus for a pair of suspended vehicle wheels comprising first and second simulator units disposed laterally adjacent but spaced apart according to the spacing between said wheels, each unit comprising:
- a support frame, damping means connecting the frame to a reference surface to permit relative displacement therebetween, a pair of drums mounted on the frame in spaced relation for rotation about parallel axes, a flexible belt having an inner surface engaging the drums to be rotatable therewith,
- load support means for providing a load support area of the belt mediate the drums,
- actuator means connected to the load support means for imparting reciprocating displacement inputs thereto over a range of selectable frequencies,
- and spring means supporting the frame relative to the support means and having a frequency selective transfer characteristic whereby relatively low frequency inputs cause the load support means and the frame to be displaced substantially together and inputs of a relatively high frequency cause the load support means to be displaced relative to the frame, said frames being pivotally supported relative to the damping means,
- and a beam connecting the frames of the first and second simulator units to provide coordinate movement thereof.

6. Road simulator apparatus comprising in combination;
- a test cell having a floor,
- a load support unit having a roller pad disposed on an upper horizontal surface thereof,
- hydraulic actuator means supporting the load support unit relative to the floor and actuable to vertically reciprocate the load support unit over a frequency range including relatively low and relatively high frequency components,
- a generally rectangular perimeter frame,
- a pair of drums mounted on the frame in spaced relation for rotation about parallel axes,
- a flexible belt stretched between and engaging the drums to be rotatable therewith,
- the roller pad being in contact with the inner surface of the belt mediate the drums to provide a load support surface of the belt,
- at least one spring supporting the frame relative to the load support unit,
- and a pair of dampers connecting the frame to the floor.

References Cited

UNITED STATES PATENTS

| | | | |
|---|---|---|---|
| 1,894,935 | 1/1933 | Bigelow | 73—126 |
| 2,799,158 | 7/1957 | Federspiel | 73—71.7 |

OTHER REFERENCES

An article entitled "Vibrations in Vehicles and Methods of Investigating Them" by F. Engels delivered at a symposium held July 4th and 5th, 1967 and published in "Instrument and Test Techniques for Motor Vehicles," pp. 140–151 (pp. 146–9), copyrighted 1967 by The Institution of Mechanical Engineers.

JAMES J. GILL, Primary Examiner

U.S. Cl. X.R.

73—146